US010144535B2

(12) United States Patent
Li et al.

(10) Patent No.: US 10,144,535 B2
(45) Date of Patent: Dec. 4, 2018

(54) CRYOGENIC HYDROGEN RADIATION SHIELD FOR HUMAN SPACEFLIGHT

(71) Applicant: The United States of America as represented by the Administrator of the National Aeronautics and Space Administration, Washington, DC (US)

(72) Inventors: Xiaoyi Li, Clarksville, MD (US); Shouvanik Mustafi, Silver Spring, MD (US); Alvin J. Boutte, Lanham, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 396 days.

(21) Appl. No.: 14/856,174

(22) Filed: Sep. 16, 2015

(65) Prior Publication Data

US 2017/0073090 A1   Mar. 16, 2017

(51) Int. Cl.
*B64G 1/54* (2006.01)
*G21F 3/00* (2006.01)
*B64G 1/58* (2006.01)
*G21F 1/02* (2006.01)

(52) U.S. Cl.
CPC ............... *B64G 1/543* (2013.01); *B64G 1/58* (2013.01); *G21F 1/023* (2013.01); *G21F 3/00* (2013.01)

(58) Field of Classification Search
CPC ............ B64G 1/543; B64G 1/58; G21F 1/023
See application file for complete search history.

(56) References Cited

U.S. PATENT DOCUMENTS

| 4,447,734 A * | 5/1984 | Kusumegi | ............... G21F 7/03 |
| | | | 250/515.1 |
| 8,809,824 B1 * | 8/2014 | Kinstler | ................... G21F 5/00 |
| | | | 244/171.7 |
| 2015/0144739 A1 * | 7/2015 | Kinstler | ................... B64G 1/58 |
| | | | 244/171.7 |

\* cited by examiner

*Primary Examiner* — Brian M O'Hara
*Assistant Examiner* — Keith L Dixon
(74) *Attorney, Agent, or Firm* — Christopher O. Edwards; Bryan A. Geurts; Mark P. Dvorscak

(57) ABSTRACT

The disclosed subject matter relates to a radiation shielding apparatus including a cryogenic vessel and a cryogenic hydrogen radiation shielding material capable of providing a radiation shield, the cryogenic hydrogen radiation shielding material including cryogenic hydrogen.

8 Claims, 7 Drawing Sheets

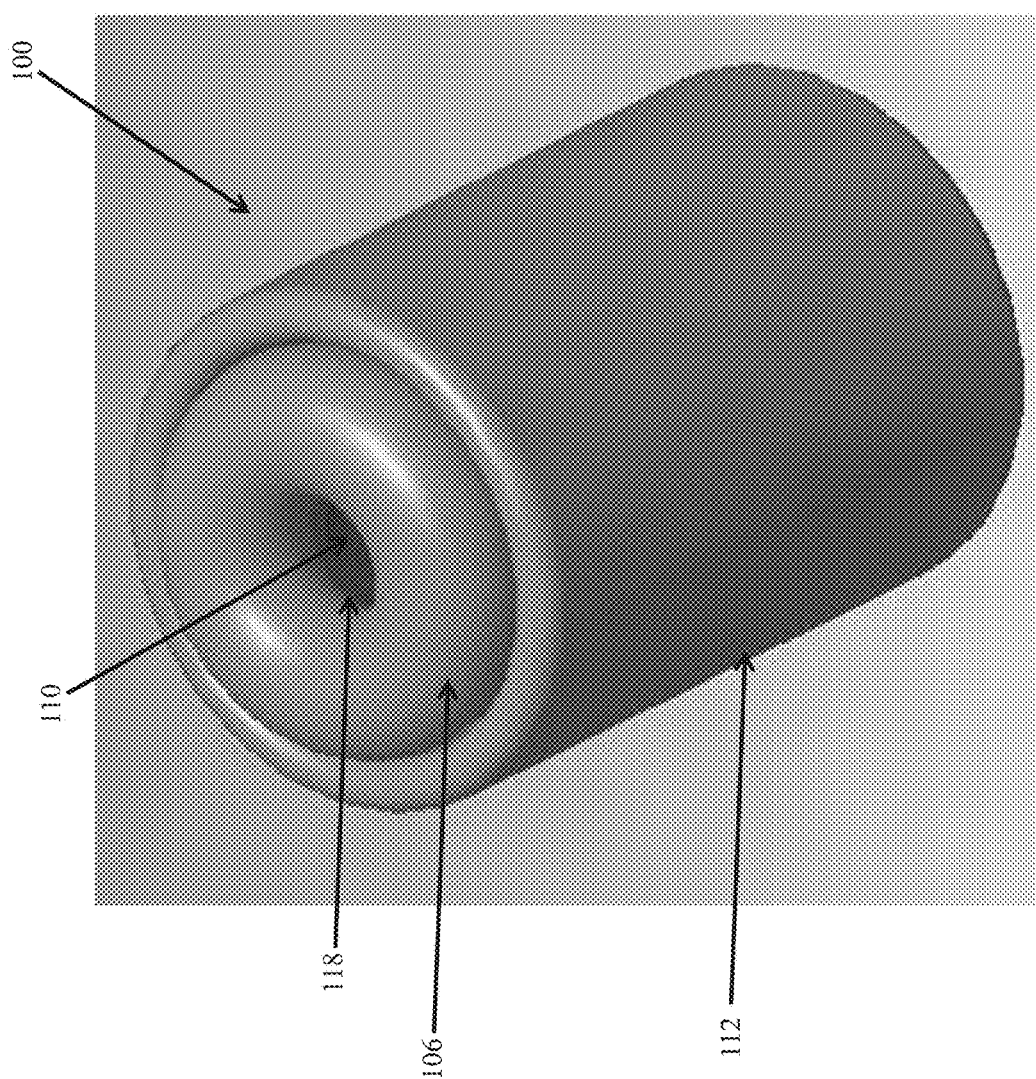

CRYOGENIC HYDROGEN RADIATION SHIELD FOR HUMAN SPACEFLIGHT

FIELD OF THE INVENTION

This invention relates to protecting a manned spacecraft from radiation in space.

BACKGROUND

Human susceptibility to the harsh space radiation environment has been identified as being a major hurdle for exploration beyond low Earth orbit (LEO). High energy protons and nuclei ions from Solar Energetic Particles (SEPs) and Galactic Cosmic Rays (GCRs) can result in radiation doses that are dangerous to astronaut health and even survivability if the astronauts are not adequately shielded. These high energy particles also cause significant amounts of secondary radiation when they impinge on spacecraft structure. The secondary neutron radiation may cause human radiogenic cancers. Hydrogen or hydrogen rich materials are ideal materials for radiation shielding because hydrogen does not easily break down and become a source for secondary radiation.

When a spacecraft is positioned in LEO, the Earth's magnetic field provides some radiation protection to the spacecraft and the astronauts occupying it. Radiation protection for astronauts is critical for the future of human space flight since conventional spacecraft construction materials such as aluminum are susceptible to secondary radiation when SEPs or GCRs impinge on them. Because of the size of an aluminum nucleus, the secondary radiation produced while shielding space radiation can be just as damaging as the primary radiation and this secondary radiation contributes to the total ionizing dose received by the astronauts. Other types of hydrogen-rich materials, such as polyethylene, have been tested to determine their effectiveness at reducing the dose received from all sources of radiation. Such shielding materials do not produce the same level of damaging secondary radiation, however, the presence of carbon atoms in polyethylene means that there is less hydrogen shielding material per unit of shielding material mass than there would be if hydrogen itself is used as the shielding material. However, hydrogen is a challenging substance to store and manage and, therefore, has not been considered as a viable shielding material for spacecraft.

Developing a system using cryogenic material, hydrogen, that is maintained at, for example, 10-12 K ("K" here and throughout refers to "° K" or "degrees Kelvin"), for radiation shielding presents several challenges. Thermal challenges include, for example, heat leak from the space environment into cryogenic hydrogen shielding due to, for example solar irradiation, planetary albedo, heat leak from the crew capsule that is maintained at room temperature of about 300 K, power system, propulsion, etc. into the cryogenic hydrogen shield. It is also challenging to process the cryogenic hydrogen on the ground, prior to launch, and bring it to a frozen temperature of 10 K while the hydrogen is contained in a tank that is in an ambient approximately 300 K environment.

BRIEF DESCRIPTION

In one embodiment, a radiation shielding apparatus is provided. The radiation shielding apparatus includes a cryogenic vessel and a cryogenic hydrogen radiation shielding material capable of providing a radiation shield, the cryogenic hydrogen radiation shielding material includes hydrogen at a temperature of less than or equal to about 20 K, wherein the cryogenic hydrogen radiation shielding material is contained in the cryogenic vessel.

In another embodiment, a spacecraft is provided. The spacecraft includes a radiation shielding apparatus and a crew module. The radiation shielding apparatus includes a cryogenic vessel and a cryogenic hydrogen radiation shielding material capable of providing a radiation shield, the cryogenic hydrogen radiation shielding material includes hydrogen at a temperature of less than or equal to about 20 K, wherein the cryogenic hydrogen radiation shielding material is contained in the cryogenic vessel. The crew module includes a walled enclosure with an exterior surface and a hatch to permit access and egress to an internal area within the walled enclosure, wherein the radiation shielding apparatus is disposed adjacent to the exterior surface of the crew module.

In another embodiment, a spacecraft is provided. The spacecraft includes a fuselage, a radiation shielding apparatus, a crew module and a radiator system. The fuselage defines an internal volume within the spacecraft. The radiation shielding apparatus is disposed in the internal volume of the fuselage and includes a cryogenic vessel, insulation material and a cryogenic hydrogen radiation shielding material capable of providing a radiation shield, the cryogenic hydrogen radiation shielding material including solid hydrogen, subcooled solid hydrogen or a mixture thereof, wherein the cryogenic hydrogen radiation shielding material is contained in the cryogenic vessel. The crew module is disposed in the internal volume of the fuselage and includes a walled enclosure with an exterior surface and a hatch to permit access and egress to an internal area within the walled enclosure, the internal area of the crew module being substantially maintained at about room temperature. The radiator system is to remove heat emitting from the crew module. The radiation shielding apparatus is disposed between the fuselage and the exterior surface of the crew module. The radiator system is disposed between the exterior surface of the crew module and radiation shielding apparatus.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1A is a top perspective view of a shielded capsule;

DETAILED DESCRIPTION

Studies have shown there will be a need to protect astronauts during, for example, interplanetary missions (e.g., Mars) from deep space radiation with an annual allowable radiation dose less than 500 mSv. For a typical crew module that is 4 meter in diameter and 8 meter in length, the mass of polyethylene radiation shielding required would be more than 17,500 kg at a needed shielding a real density of approximately 140 kg/m². By comparison, the requirement for hydrogen shielding is 70 kg/m², much less than polyethylene shielding. Vapor hydrogen has a very low density, and the storage tank can't fit into a 5 meter payload fairing for a rocket that might launch the crew module. Liquid and solid hydrogen have much higher densities and are preferable to vapor hydrogen for the purpose of packaging the required hydrogen areal density in a reasonable volume. For example, the thickness of solid hydrogen needed to shield astronauts is about 0.43 m and the combined diameter of the crew module with shielding is about 4.86 m. However, a challenge with using either liquid or solid hydrogen as shielding material is that the hydrogen has to be stored at cryogenic temperatures. The Cryogenic Hydrogen Radiation Shielding (CHRS) requires a thermal system to prevent heat leak into cryogenic tank from the crew module (substantially maintained at room temperature, for example, about 300 K) to avoid phase change of the cryogenic hydrogen. However, even after accounting for the mass of the thermal and containment system for CHRS, CHRS may halve the mass of a radiation shield when compared to polyethylene shields. The crew module is intended to be suitably maintained in temperature and atmosphere to adequately support life and provide an environment in which astronauts could live.

CHRS material includes liquid hydrogen, subcooled liquid hydrogen, solid hydrogen and subcooled solid hydrogen or a mixture thereof, preferably solid hydrogen, subcooled solid hydrogen or a mixture thereof and more preferably subcooled solid hydrogen. Liquid hydrogen at a pressure of 1 atm can be stored at a maximum temperature of about 20 K. Subcooled liquid hydrogen can be stored at a temperature from about 14 K to about 20 K. Solid hydrogen can be stored at a maximum temperature of about 14 K (the triple point of hydrogen). Subcooled solid hydrogen can be stored at a temperature of less than about 14 K, preferably from about 10 K to about 12 K. Subcooled solid hydrogen may have an advantage in that it can absorb more heat without changing phase. CHRS material has a lower mass density compared to other radiation shielding materials, such as aluminum and polyethylene. The degree of radiation shielding provided by a CHRS material depends on the mass of hydrogen per unit surface area.

Figure 1B:
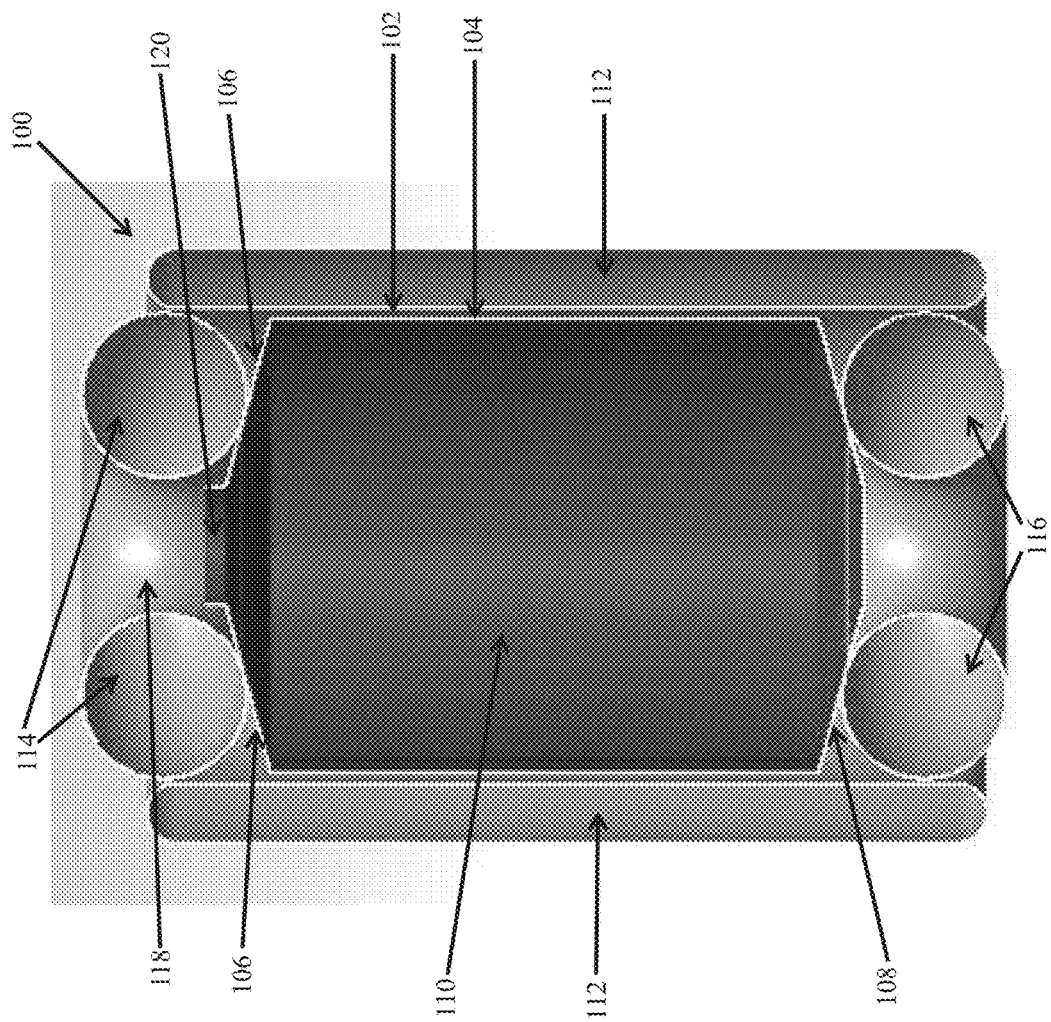
FIG. 1B is a cross-sectional view of the shielded capsule of FIG. 1A.

One embodiment includes a shielded capsule 100 including cryogenic hydrogen radiation shielding as shown in FIG. 1A and FIG. 1B. FIG. 1A and FIG. 1B include a crew module 102 defined by a circumferential side wall 104 and end walls 106 and 108 and having an inner volume 110 which the crew may inhabit. The crew module 102 is protected by an annular cryogenic vessel 112 adjacent the circumferential side wall 104 and by toroidal cryogenic vessels 114 and 116 adjacent end walls 106 and 108, respectively. When the capsule is in operation, the annular cryogenic vessel 112 and toroidal cryogenic vessels 114 and 116 contain CHRS material to provide radiation shielding to the crew module 102. A bore 118 in the middle of toroidal cryogenic tank 114 leads to hatch 120 to allow for crew access and egress from inner volume 110 of the crew module 102. Bore 118 and/or the hatch 120 can be closed with a suitable radiation shielding hatch cover in order to minimize radiation from reaching the inner area of the crew module through bore 118 and/or hatch 120. The suitable radiation shielding hatch cover may be movable and constructed of a suitable radiation shielding material, such as for example, polyethylene.

Figure 2:
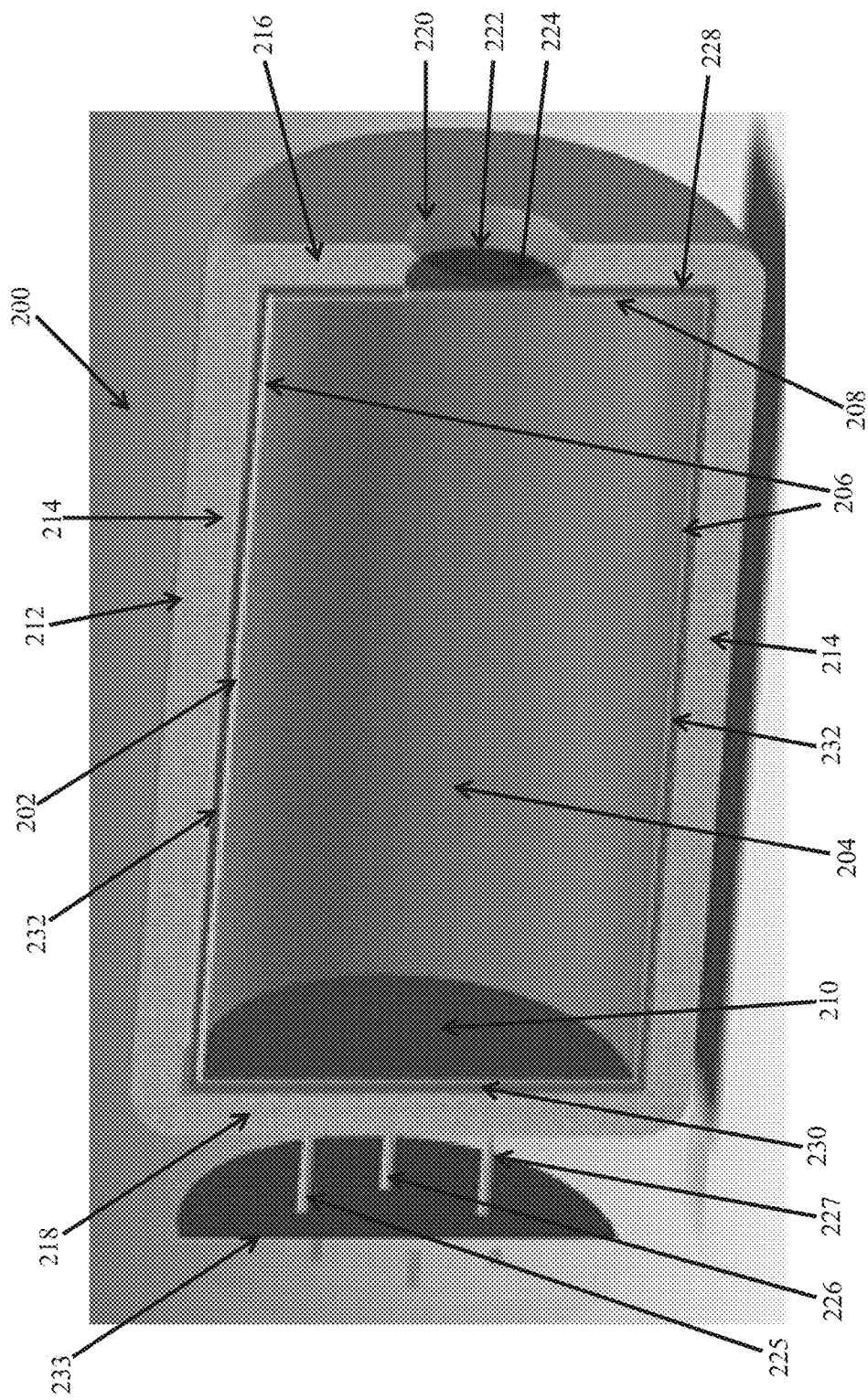
FIG. 2 is a cross-sectional view of a shielded capsule.

Another embodiment includes a shielded capsule 200 including cryogenic hydrogen radiation shielding as shown in FIG. 2. FIG. 2 includes a crew module 202 having an inner volume 204 which the crew may inhabit, circumferential side wall 206 and end walls 208 and 210. The crew module 202 is surrounded by a cryogenic vessel 212. When the capsule is in operation, the cryogenic vessel 212 contains CHRS material, such as solid hydrogen, to provide radiation shielding to the crew module 202. The cryogenic vessel 212 includes a circumferential vessel portion 214 adjacent circumferential side wall 206 and vessel end portions 216 and 218 adjacent end walls 208 and 210, respectively. A bore 220 in the middle of vessel end portions 216 leads to hatch 222 which allows for crew access and egress from the crew module 202 of the shielded capsule 200. Bore 220 and/or the hatch 222 can be sealed with a suitable radiation shielding hatch cover 224 that may be movable and constructed of a suitable radiation shielding material, such as for example, polyethylene. A passive thermal management system, such as a 100 K thermal shield, includes end sections 228 and 230 adjacent end walls 208 and 210, respectively, and a side wall section 232 adjacent the circumferential side wall 206 and is positioned between the crew module 202 (circumferential side wall 206 and end walls 208 and 210) and the cryogenic vessel 212 (circumferential vessel portion 214 and vessel end portions 216 and 218). Conduits 225, 226 and 227 may provide a thermal link between a radiator 233 and the exemplified 100 K thermal shield insulation material. The radiator system (thermal management system end sections 228 and 230 and side wall section 232, conduits 225, 226 and 227 and radiator 233) rejects heat into deep space, the latter existing at a temperature of about 7 K. The radiator system removes heat emitting from the inner volume 204 of the crew module 202 in order to insulate and minimize heat transfer to the cryogenic vessel 212 from the inner volume 204 being maintained at about room temperature (about 300 K). Such heat transfer from inner volume 204 can affect and be problematic to the maintenance of the low temperature of the CHRS in the cryogenic vessel 212.

The CHRS system components including a cryogenic tank or vessel and insulation material and their design and materials should be selected based on mechanical and fluid engineering criteria including thermal performance (e.g., insulation) and structural performance (e.g., ability to maintain integrity & internal pressure) experienced in the various rigors of space as well as in a gravitational environment, such as, on a planet (e.g., Earth). The tank or vessel may be suitably constructed of, for example, metal, such as aluminum, as well as composite or composite overwrapped tank skins. For example, the cryogenic tank or vessel that contains the CHRS material should be able to withstand some pressure increase. As a result, suitable tank or vessel specification should be determined, including, for example, proper material and wall thickness. The cryogenic system components may include various conduits to supply material to and vent material from the cryogenic system including the cryogenic tank or vessel as well as sensors to monitor the cryogenic system including the cryogenic tank or vessel.

Insulation of the tank is important to maintain the temperature of the hydrogen contained therein. Such a change in temperature can be affected by various factors including convection (caused by, for example, heat flowing from the ambient atmosphere to the tank at the launch pad), conduction (caused by, for example, heat flowing from spacecraft components through the support structure to the tank) and radiation (caused by, for example, heat transmitting by solar irradiation, or planetary albedo impinging on the tank surface).

The cryogenic tank or vessel (the terms "tank" or "vessel" may be used interchangeably any where herein) may include design features and components to maintain the CHRS material therein. For example, when the CHRS material includes liquid hydrogen, low or zero gravity fluid management using screen channel and/or vane systems are two possible options for the fluid management system. Such fluid management systems may be needed to provide the required fluid distribution in the cryogenic tank or vessel, and suppress the formation of large gas bubbles therein. A vane system may also be used in several locations of the cryogenic system in order to create enough surface tension force to move gas present in the cryogenic tank or vessel to a vent location or a cooler location for recondensation.

The cryogenic system supplying, supporting and maintaining the cryogenic tank or vessel and the CHRS material therein may be active or passive and include a space thermal system and ground cooling system. The ground cooling system may be utilized to supply, support and maintain the cryogenic system and cryogenic tank or vessel aboard a spacecraft prior to launch, including, for example, on Earth. Such a ground cooling system may, for example, utilize a cryogenic hydrogen subcooler to cool hydrogen close to triple point temperature within a day and a helium cooler to freeze and subcool the hydrogen to 10 K. Such a ground cooling system may be included in a spacecraft or separate there from, preferably it is housed at a launch facility separate from the spacecraft and located on or close to the launch pad. In the latter preferred embodiment, the ground cooling system is connected to the spacecraft and disconnected at or before launch.

The space thermal system (thermal management system) may be utilized to supply, support and maintain the cryogenic system and cryogenic tank or vessel aboard a spacecraft after launch or once a separate ground cooling system is disconnected from the spacecraft. In one embodiment, the CHRS including the solid hydrogen, the cryogen thermal and storage system would have an areal mass density of 70 kg/m$^2$. Such a system could utilize, for example, a passive thermal control system including solar shields, load responsive multilayer insulation (LRMLI), multilayer insulation (MLI), aluminum foam (for example, 3% density), and 100 K shield cooled by a 4 meter diameter radiator. Such a design may utilize the benefit of the 7 K temperature of deep space (for example, when the spacecraft is not in planetary orbit) by pointing the radiator towards deep space. The preliminary thermal analysis results show that the heat leak from a crew module is 50 Watt, which can be easily compensated with a small heater, such as radiator 233 shown in FIG. 2. As a further example, the CHRS can absorb 1 Watt of heat in deep space from the Sun and 130 Watt of heat from the Earth and Sun over a couple of orbits in LEO. For a one year mission to Mars, for example, a spacecraft may stay in LEO for a few hours. The overall heat leak could be about 32,500 kJ for the whole mission, which could increase the temperature of, for example, solid hydrogen from 10 K to close to 14 K (the triple point of hydrogen). In this example, with CHRS, the mass of crew module with radiation shielding could be reduced from more than 26,500 kg to less than 17,800 kg. CHRS could save nearly 8,800 kg for a 4 m diameter and 8 m long cylindrical crew module and halves the required shielding mass when compared with polyethylene shields. Such could, for example, save close to 44 million dollars in launch cost, based on $5000/kg estimate for SpaceX Felcon 9. In another embodiment, the space thermal system may also include a cryocooler, for example, a 14K cryocooler, in the design to actively store the hydrogen at a desired cryogenic temperature and in, for example, solid form. Such a cryocooler, for example, a 14K cryocooler, may be beneficial on space missions lasting more than 1 year.

Figure 3:
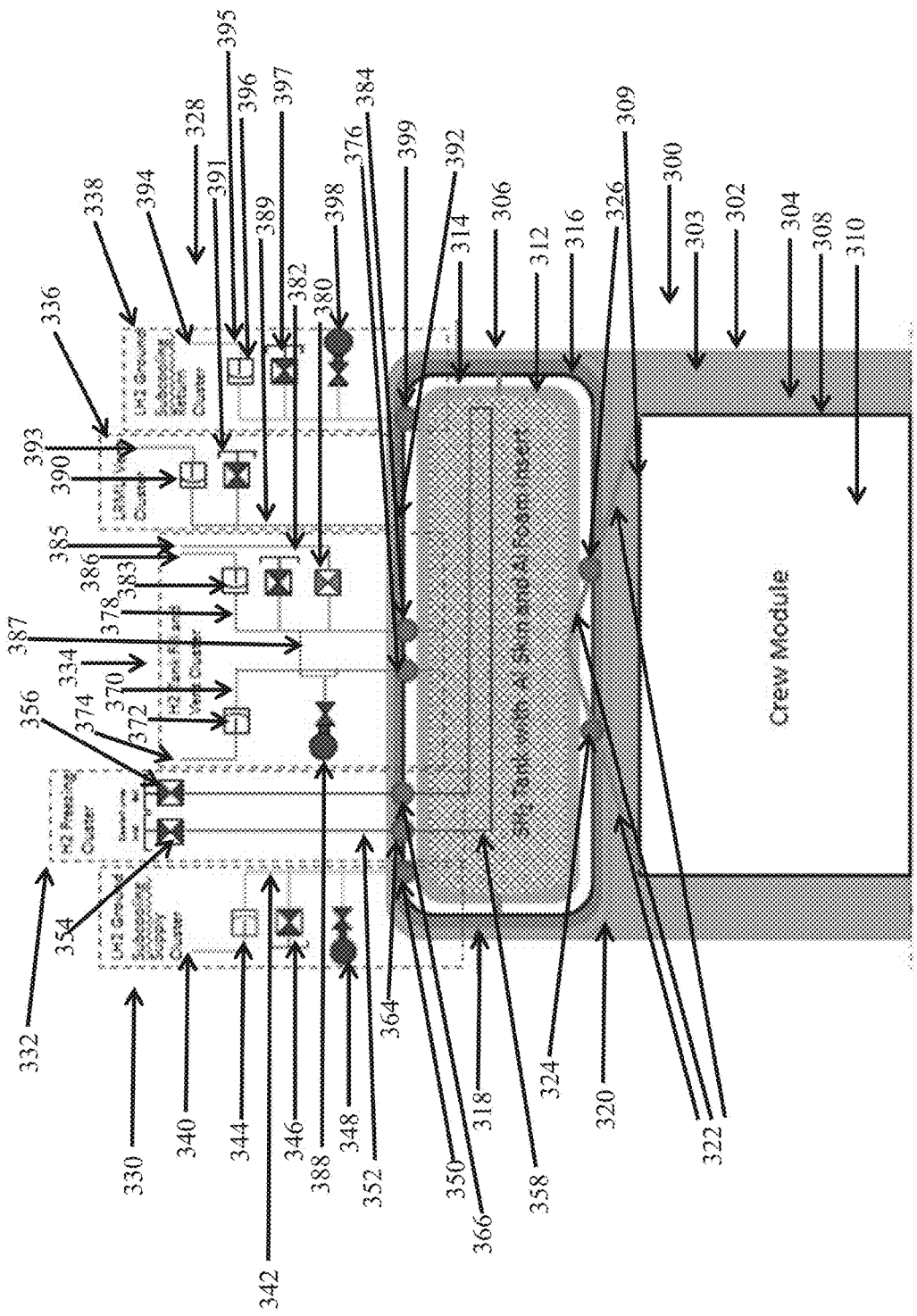
FIG. 3 is a schematic representation of a ground cooling system and section view of a spacecraft, radiation shield and space thermal system.

FIG. 3 illustrates an embodiment showing a space thermal system and a ground cooling system, around a crew module. It shows half of a section view of the spacecraft, since the spacecraft is reasonably symmetric about the bottom horizontal edge of the schematic. Spacecraft 300 includes a fuselage 302 with an internal volume (area) 303, a crew module 304 and space thermal system 306. The crew module 302 includes a walled enclosure 308 with an exterior surface 309 and an internal volume (area) 310 within the walled enclosure 308. Space thermal system 306 has a tank 312 including, for example, a metal skin, for example, aluminum, and a foam insert, for example, aluminum foam, preferably about 1% to about 3% density aluminum foam, more preferably about 1% density aluminum foam. In the embodiment, tank 312 is encased with several exemplary layers of insulation materials. Encasing tank 312 is a tank integrated multilayer insulation (IMLI-a product of Quest Thermal Group) 314 composed of, for example, layers of multilayer insulation (MLI) with polymer spacers. Encasing the tank IMLI 314 is a 100 K thermal shield 316 composed of, for example, aluminum. Encasing the 100 K thermal shield 316 is a 100 K thermal shield load responsive multilayer insulation (LRMLI-a product of Quest Thermal Group) 318 composed of, for example, layers of MLI supporting a lightweight metallic vacuum shell with polymer spacers. Encasing the 100 K thermal shield LRMLI 318 is 100 K thermal shield IMLI 320 composed of, for example, layers of MLI with polymer spacers. Spacecraft 300 also includes low thermal conductivity support structure 322 (for example, T300) and thermal connections 324 and 326 that provide heat sinks for heat interception.

Ground cooling system 328 includes liquid hydrogen supply cluster 330, hydrogen freezing cluster 332, hydrogen tank fill and vent cluster 334, LRMLI vent cluster 336 and liquid hydrogen ground subcooling return cluster 338. Liquid hydrogen subcooling supply cluster 330 is connected at 340 to a hydrogen subcooler and includes conduit system 342, burst disk/relief valve 344, seal-off valve 346 and thermal acoustic oscillation damper 348. Conduit system 342 is connected to tank 312 at thermal connection 350. Hydrogen freezing cluster 332 performs a freeze and subcooled freezing operation on hydrogen in tank 312 and includes an inlet and outlet for the hydrogen freezing coolant in a conduit 352 that runs from seal-off valve 354 to seal-off valve 356 through thermal connection 364, section 358 that passes through tank 312 and thermal connection 366. Hydrogen tank fill and vent cluster 334 includes conduit system 370 and burst disk/relief valve 372. Conduit system 370 is connected to a hydrogen source at 374 and provides hydrogen to tank 312 via thermal connection 376. Hydrogen tank fill and vent cluster 334 also includes conduit system 378 with pyro valve 380 connected to vent 385, seal-off valve 382 and burst disk/relief valve 383 connected to vent 386. Conduit system 378 is connected to tank 312 via thermal connection 384 to vent hydrogen from tank 312. Conduit systems 370 and 378 are connected via conduit system 387 that includes thermal acoustic oscillation damper 388. LRMLI vent cluster 336 is used to vent the LRMLI for convection insulation while the radiation shield is on the ground in an environment with an atmosphere and includes conduit system 389, burst disk/relief 390 and seal-off valve 391. Conduit system 389 is connected to tank 312 at 392 and vents through a vacuum pump at 393. Liquid hydrogen ground subcooling return cluster 338 is connected at 394 to the return side of the hydrogen subcooler and includes conduit system 395, burst disk/relief valve 396, seal-off valve 397 and thermal acoustic oscillation damper 398. Conduit system 395 is connected to tank 312 at thermal connection 399.

Using the CHRS system, the crew module can be substantially maintained at about room temperature with a 50 Watt heater, while keeping the CHRS temperature at the desired low temperature, for example, below 14 K.

The mass and the power requirements of the CHRS system aboard a spacecraft should be determined and incorporated into the overall spacecraft design. For example, the mass of solar panels that may be needed for the power requirement should be calculated and added to the CHRS system when liquid hydrogen is used.

Figure 4:
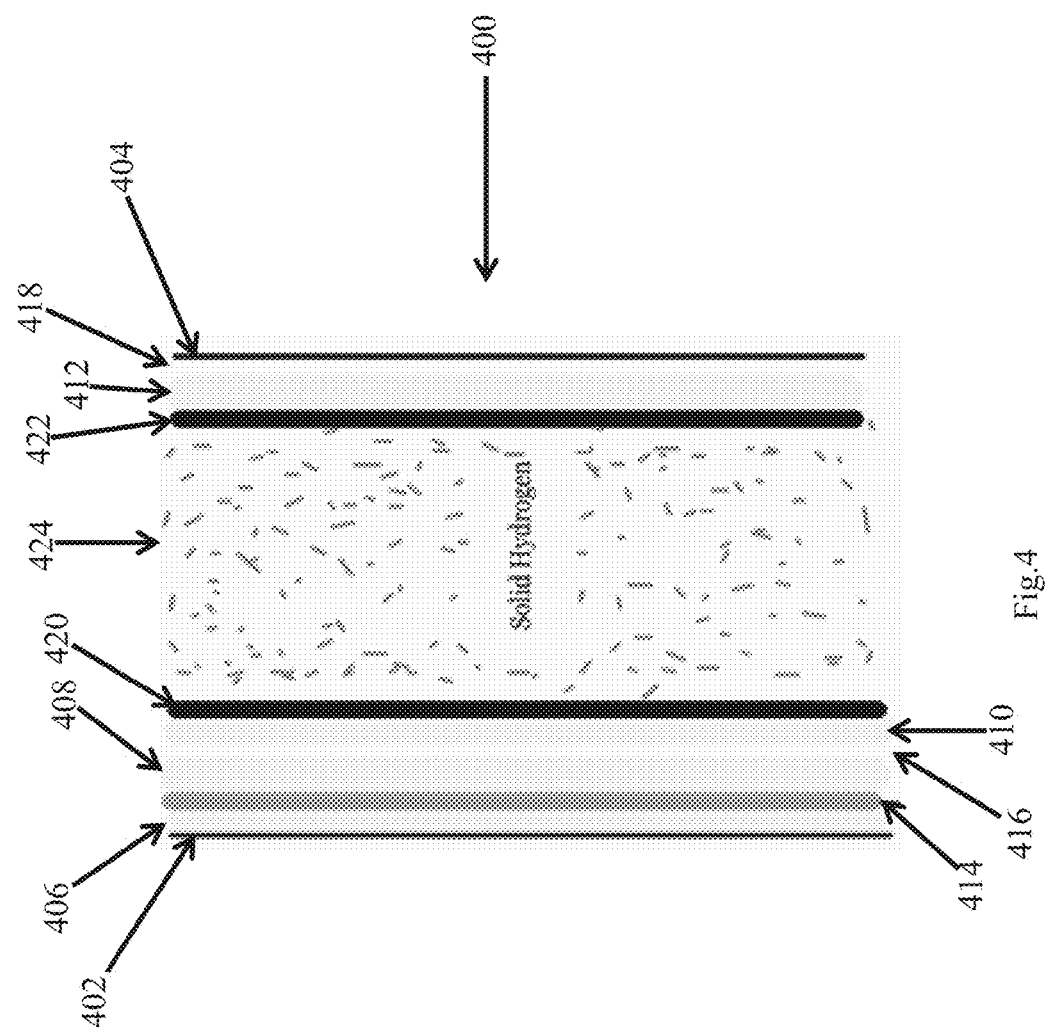
FIG. 4 is a sectional view of a radiation shield.

FIG. 4 illustrates a CHRS tank and insulation 400 embodiment including LRMLI 402 and 404, MLI or IMLI 406, 408, 410 and 412, 90-100 K shield 414, gaps 416 and 418, CHRS tank walls 420 and 422 and solid hydrogen and aluminum foam 424. A crew module is positioned in this embodiment closest to LRMLI 402.

Figure 5:
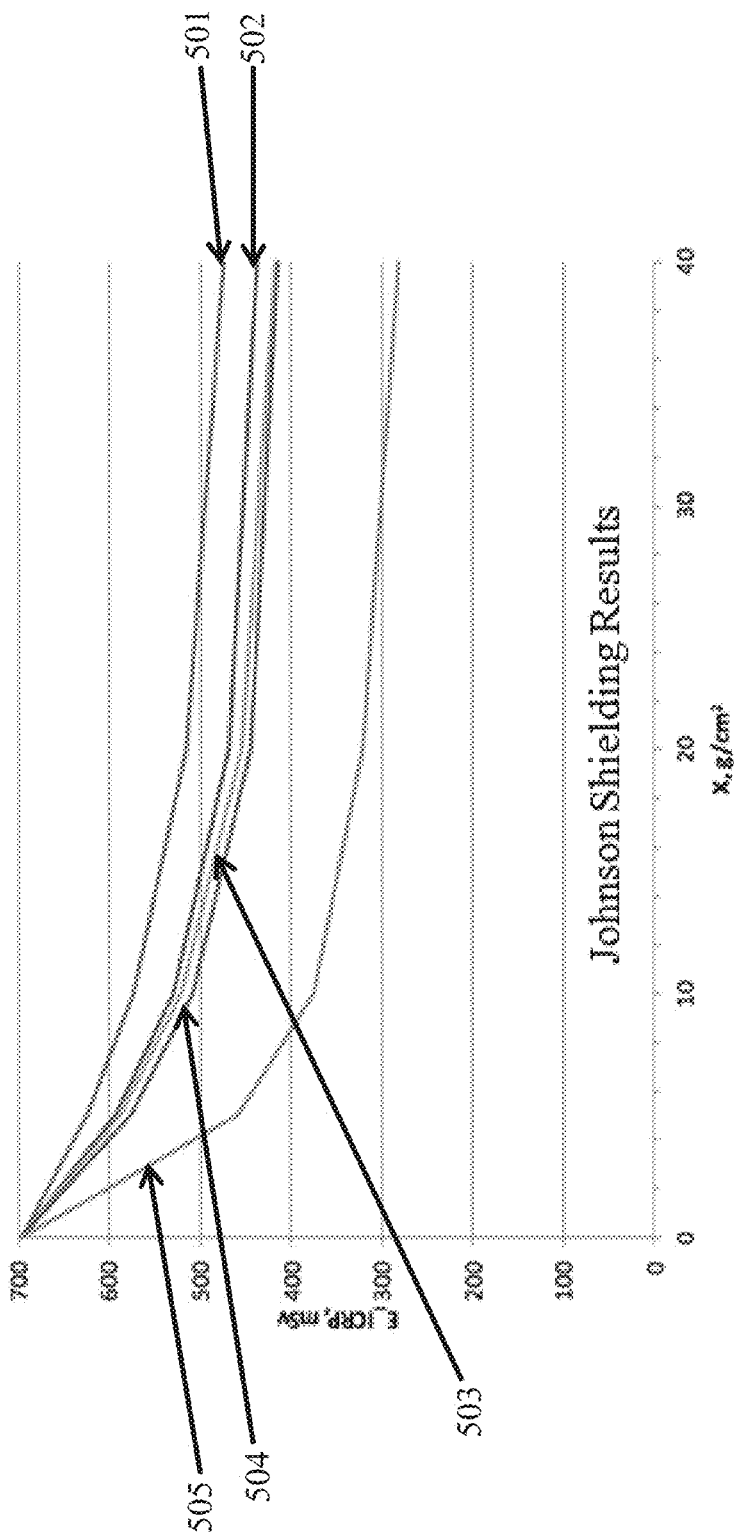
FIG. 5 illustrates a comparison of radiation shielding provided by different materials.
Figure 6:
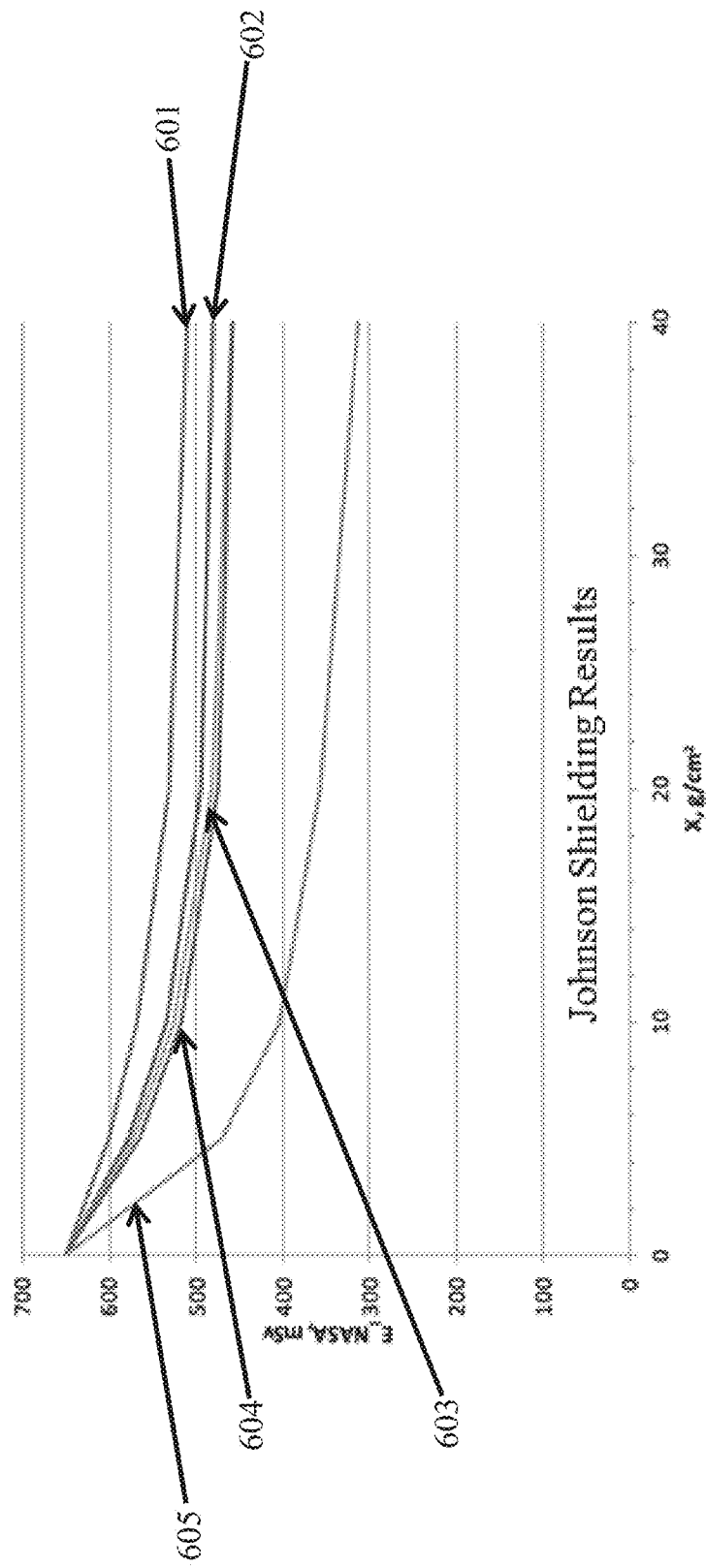
FIG. 6 illustrates a comparison of radiation shielding provided by different materials.

FIG. 5 illustrates comparisons on depth-effective dose estimates versus shielding thickness using the ICRP definition of quality factors for several materials. FIG. 6 illustrates comparisons on depth-effective dose estimates versus shielding thickness using the NASA Solid cancer definition of quality factors for several materials. Calculations For both FIG. 5 and FIG. 6 are for 1-year GCR exposures at solar minimum of a human behind each of the shielding materials. The shielding materials in FIG. 5 and FIG. 6 are aluminum (graphs 501 and 601, respectively), epoxy (graphs 502 and 602, respectively), water (graphs 503 and 603, respectively), polyethylene (graphs 504 and 604, respectively), and liquid hydrogen (graphs 505 and 605, respectively). The horizontal axis indicates the g/cm2 of each of the materials and the vertical axis indicates the radiation dose (exposure) in millisievert (mSv).

Another benefit of an embodiment utilizing, for example, CHRS material could be used for other mission purposes, such as fuel for a final burn that could help capture the spacecraft into low Earth orbit on a return trajectory or even be used for a burn on a lunar ascent vehicle. Such a dual use could further increase the mass advantage of such embodiments.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A radiation shielding apparatus, comprising:
   a. an annular cryogenic vessel adjacent a circumferential side wall of a crew module; and
   b. a cryogenic hydrogen radiation shielding material capable of providing a radiation shield, said cryogenic hydrogen radiation shielding material including hydrogen at a temperature of less than or equal to about 20 K,
   wherein said cryogenic hydrogen radiation shielding material is contained in said annular cryogenic vessel.

2. The radiation shielding apparatus of claim 1, wherein said cryogenic hydrogen radiation shielding material includes hydrogen at a temperature of less than or equal to about 14 K.

3. The radiation shielding apparatus of claim 1, wherein said cryogenic hydrogen radiation shielding material includes hydrogen at a temperature of less than or equal to about 12 K.

4. The radiation shielding apparatus of claim 1, said cryogenic hydrogen radiation shielding material including hydrogen at a temperature of from about 10 K to about 12 K.

5. The radiation shielding apparatus of claim 1, wherein said cryogenic hydrogen radiation shielding material includes liquid hydrogen, subcooled liquid hydrogen, solid hydrogen, subcooled solid hydrogen or a mixture thereof.

6. The radiation shielding apparatus of claim 1, wherein said cryogenic hydrogen radiation shielding material includes solid hydrogen, subcooled solid hydrogen or a mixture thereof.

7. The radiation shielding apparatus of claim 6, wherein said annular cryogenic vessel includes an aluminum skin and aluminum foam.

8. The radiation shielding apparatus of claim 1, wherein the cryogenic vessel includes at least one connector capable of attaching to a conduit capable of supplying or maintaining the temperature of the cryogenic hydrogen radiation shielding material.

* * * * *